United States Patent
Chilton et al.

(10) Patent No.: US 6,516,390 B1
(45) Date of Patent: Feb. 4, 2003

(54) METHODS AND APPARATUS FOR ACCESSING DATA WITHIN A DATA STORAGE SYSTEM

(75) Inventors: Kendell A. Chilton, Southborough, MA (US); Daniel Castel, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 255 days.

(21) Appl. No.: 09/697,454

(22) Filed: Oct. 26, 2000

(51) Int. Cl.$^7$ ............................ G06F 12/08; G06F 13/00
(52) U.S. Cl. ......................................... 711/138; 100/113
(58) Field of Search ............................ 711/100, 111, 711/112, 113, 138, 149, 154

(56) References Cited

U.S. PATENT DOCUMENTS

| | | | |
|---|---|---|---|
| 5,398,316 A | * 3/1995 | Guttag et al. | 604/369 |
| 5,432,919 A | * 7/1995 | Falcone et al. | 711/134 |
| 5,493,668 A | * 2/1996 | Elko et al. | 711/130 |
| 5,537,563 A | * 7/1996 | Guttag et al. | 711/100 |
| 5,584,007 A | * 12/1996 | Ballard | 711/113 |
| 5,588,129 A | * 12/1996 | Ballard | 711/113 |
| 5,606,347 A | * 2/1997 | Simpson | 345/187 |

* cited by examiner

*Primary Examiner*—Tuan V. Thai
(74) *Attorney, Agent, or Firm*—Chapin & Huang, L.L.C.; David E. Huang, Esq.

(57) ABSTRACT

The invention is directed to techniques for accessing data within a data storage system having a circuit board that includes both a front-end circuit for interfacing with a host and a back-end circuit for interfacing with a storage device. To move data between the host and the storage device, an exchange of data between the front-end circuit and the back-end circuit can occur within the circuit board thus circumventing the cache of the data storage system. Such operation not only reduces traffic through the cache, but also shortens the data transfer latency. In one arrangement, a data storage system includes a cache, a first front-end circuit that operates as an interface between the cache and a first host, a second front-end circuit that operates as an interface between the cache and a second host, a first storage device (e.g., a disk drive, tape drive, CDROM drive, etc.), a second storage device, a first back-end circuit that operates as an interface between the cache and the first storage device, and a second back-end circuit that operates as an interface between the cache and the second storage device. The first front-end circuit and the first back-end circuit reside on a first circuit board. Similarly, the second front-end circuit and the second back-end circuit reside on a second circuit board. Accordingly, data transfer between the first host and the first storage device can occur through the first front-end circuit and the first back-end circuit (both of which are on the first circuit board) and circumvent the cache. Likewise, data transfer between the second host and the second storage device can occur through the second front-end circuit and the second back-end circuit (both of which are on the second circuit board) and circumvent the cache. Such data transfers decreases traffic through the cache and reduces data retrieval latencies for non-cached read operations.

21 Claims, 5 Drawing Sheets

METHODS AND APPARATUS FOR ACCESSING DATA WITHIN A DATA STORAGE SYSTEM

BACKGROUND OF THE INVENTION

A typical data storage system stores and retrieves data for external hosts. FIG. 1 shows a high-level block diagram of a conventional data storage system 20. The data storage system 20 includes front-end circuitry 22, a cache 24, back-end circuitry 26 and a set of disk drives 28-A, 28-B (collectively, disk drives 28). The cache 24 operates as a buffer for data exchanged between external hosts 30 and the disk drives 28. The front-end circuitry 22 operates as an interface between the hosts 30 and the cache 24. Similarly, the back-end circuitry 26 operates as an interface between the cache 24 and the disk drives 28.

FIG. 1 further shows a particular implementation 32 of the data storage system 20. In the implementation 32, the front-end circuitry 22 includes multiple front-end circuit boards 34. Each front-end circuit board 34 includes a pair of front-end directors 36-A, 36-B. Each front-end director 36 (e.g., the front-end director 36-A of the front-end circuit board 34-1) is interconnected between a particular host 30 (e.g., the host 30-A) and a set of M buses 38 that lead to the cache 24 (M being a positive integer), and operates as an interface between that particular host 30 and the cache 24.

Similarly, the back-end circuitry 26 includes multiple back-end circuit boards 40. Each back-end circuit board 40 includes a pair of back-end directors 42-A, 42-B. Each back-end director 42 is interconnected between a particular disk drive 28 and the M buses 38 leading to the cache 24, and operates as an interface between that disk drive 28 and the cache 24.

Each disk drive 28 has multiple connections 44, 46 to the cache 24. For example, the disk drive 28-A has a first connection 44-A that leads to the cache 24 through the back-end director 42-A of the back-end circuit board 40-1, and a second connection 46-A that leads to the cache 24 through another back-end director of another back-end circuit board 40 (e.g., a back-end director of the back-end circuit board 40-2). An explanation of how the implementation 32 of the data storage system 20 retrieves a block of data (e.g., 512 bytes) for a host 30 will now be provided.

Suppose that the host 30-A submits, to the front-end director 36-A of the front-end circuit board 34-1, a request for a block of data stored on the disk drive 28-A. In response to the request, the front-end director 36-A looks for the block in the cache 24. If the front-end director 36-A finds the block in the cache 24 (i.e., a cache hit), the front-end director 36-A simply transfers a copy of the block from the cache 24 through one of the M buses 38 to the host 30-A. This operation is called a cached read since the front-end director 36-A was able to read a cached block (a block previously existing in the cache 24) on its first attempt.

However, if the front-end director 36-A does not find the block in the cache 24 (i.e., a cache miss), the front-end director 36-A performs a non-cached read operation. Here, the front-end director 36-A places a read message in the cache 24 through one of the M buses 38. The read message directs the back-end director 42-A of the back-end circuit board 40-1 to copy the block from the disk drive 28-A to the cache 24. The back-end director 42-A, which periodically polls the cache 24 for such messages, eventually detects the read message from the front-end director 36-A. In response to such detection, the back-end director 42-A transfers a copy of the block from the disk drive 28-A through one of the M buses 38 to the cache 24. The back-end director 42-A then places a notification message into the cache 24 through one of the M buses 38. The notification message notifies the front-end director 36-A that the requested block now resides in the cache 24. The front-end director 36-A, which periodically polls the cache 24 for such notification messages and for the requested block, eventually detects the notification message or the presence of the requested block in the cache 24. In response to such detection, the front-end director 36-A transfers the copy of the block from the cache 24 through one of the buses 38 to the host 30-A.

As described above, the non-cached read operation requires more time to fulfill than the above-described cached read operation. In particular, the extra step of putting the data block into the cache 24, and then reading the data block from the cache 24 takes unnecessary time and adds to the latency of the overall operation, thus reducing performance.

It should be understood that the implementation 32 of the data storage system 20 can handle a subsequent request from a host 30 for the block of data by simply transferring the copy of the block residing in the cache 24 to the host 30 (i.e., a cache hit) without having to re-read the block from a disk drive 28. Such operation significantly reduces the block retrieval latency particularly since retrieval time for a block of data from a disk drive is typically an order of magnitude higher than retrieval time for a block of data from cache memory.

It should be further understood that the redundant features of the data storage system implementation 32 (e.g., the redundant front-end directors 36, the redundant back-end directors 42, the M buses 38, the multiple disk drive connections 44, 46, etc.) provide fault-tolerant and load balancing capabilities for the data storage system implementation 32. For example, if the back-end director 42-A fails and is thus unable to retrieve a data block from the disk drive 28-A in response to a request from the host 30-A, another back-end director 42 (e.g., a back-end director 42 residing on the circuit board 40-2) can respond to the request by retrieving the requested block through a redundant path to the disk drive 28-A (see the connection 46-A of FIG. 1).

SUMMARY OF THE INVENTION

Unfortunately, there are deficiencies to the above-described conventional implementation 32 of the data storage system 20 of FIG. 1. For example, for transactions requiring many non-cached read operations such as media streaming, there is a heavy amount of traffic through the connection infrastructure between the front-end directors 36 and the back-end directors 38 (i.e., the cache 24 and the M buses 38). For such non-cached read operations, the exchanging of data blocks, read messages and notification messages, as well as the polling for such messages tends to clog this connection infrastructure.

Additionally, there are delays associated with using the M buses 38. In particular, each director 36, 42 must arbitrate for use of the buses 38. A bus controller (not shown) typically grants the directors 36, 42 access to the buses 38 in accordance with a fair arbitration scheme (e.g., a round-robin arbitration) to guarantee that none of the directors 36, 42 becomes starved for bus access. Accordingly, some directors 36, 42 may have to wait until it is their turn to use the buses 38, and such waiting is a source of latency. Particularly, in times of heavy traffic, some directors 36, 42 may have to wait extended amounts of time before obtaining access to the cache 24 through one of the buses 38 thus significantly increasing data retrieval latencies.

In contrast to the above-described conventional data storage system implementation 32, the invention is directed to techniques for accessing data within a data storage system having a circuit board that includes both a front-end circuit for interfacing with a host and a back-end circuit for interfacing with a storage device. To move data between the host and the storage device, an exchange of data between the front-end circuit and the back-end circuit can occur within the circuit board thus circumventing the cache of the data storage system. Such operation not only reduces traffic through the cache, but also shortens data transfer latency.

In one arrangement, a data storage system includes a cache, a first front-end circuit that operates as an interface between the cache and a first host, a second front-end circuit that operates as an interface between the cache and a second host, a first storage device (e.g., a disk drive, tape drive, CDROM drive, etc.), a second storage device, a first back-end circuit that operates as an interface between the cache and the first storage device, and a second back-end circuit that operates as an interface between the cache and the second storage device. The first front-end circuit and the first back-end circuit reside on a first circuit board. Similarly, the second front-end circuit and the second back-end circuit reside on a second circuit board. Accordingly, data transfer between the first host and the first storage device can occur through the first front-end circuit and the first back-end circuit (both of which are on the first circuit board) and circumvent the cache. Likewise, data transfer between the second host and the second storage device can occur through the second front-end circuit and the second back-end circuit (both of which are on the second circuit board) and circumvent the cache. Such data transfers decrease traffic through the cache and reduce data retrieval latencies for non-cached read operations as well as lighten the load on the structure to increase performance of operations not able to use this mechanism.

In one arrangement, the data storage system further includes a buffer circuit that (i) is interconnected between the first front-end circuit and the first back-end circuit and (ii) resides on the first circuit board. The buffer circuit provides a direct data pathway between the first front-end circuit and the first back-end circuit that circumvents the cache. The buffer circuit is capable of retaining copies of data elements (e.g., blocks of data) transferred from the first storage device to the first host for possible subsequent access by the first host or another host. Accordingly, a host (e.g., the first host) can acquire the data element from the buffer circuit without requiring first back-end circuit to re-transfer another copy of the data element from the first storage device.

In one arrangement, the buffer circuit includes multi-ported random access memory (RAM). The multi-ported RAM includes memory locations, a first port coupled to the first front-end circuit, and a second port coupled to the first back-end circuit. The first port enables the first front-end circuit to access the memory locations. The second port enables the first back-end circuit to access the memory locations. The multiple ports prevent accesses of the first front-end circuit and the first back-end circuit from interfering with each other through a single port.

In one arrangement, data can travel to multiple locations within the data storage system at substantially the same time. For example, the first back-end circuit can simultaneously place data from a read operation (e.g., a bicast disk read) in the cache (through a bypass) and the buffer circuit. As another example, the first back-end circuit can provide data directly to the cache and the first front-end circuit at substantially the same time (another bicast operation).

In another arrangement, the data storage system operates in a traditional manner in some situations. That is, the cache provides a data pathway between the first front-end circuit and the second back-end circuit, and the second storage device stores another data element. Here, the first front-end circuit and the second back-end circuit are configured to respond to a request, from the first host, for the other data element resulting in a cache miss by transferring a copy of the other data element from the second storage device to the first host through the data pathway between the first front-end circuit and the second back-end circuit. Accordingly, in situations that require use of a front-end circuit and a back-end circuit on different circuit boards, the data element can be transferred through the cache in a traditional manner.

In one arrangement, the multi-ported RAM further includes a third port coupled to the cache. The third port enables circuitry other than the first front-end circuit and the first back-end circuit to move data elements between the memory locations and the cache. The availability of the third port enables data exchanges between the buffer circuit and the cache, and prevents such data exchanges from interfering with accesses by the first front-end circuit and the first back-end circuit through a single port.

The features of the invention, as described above, may be employed in data storage systems, devices and methods, as well as in other computer-related mechanisms such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for accessing data within a data storage system having a circuit board that includes both a front-end circuit for interfacing with a host and a back-end circuit for interfacing with a storage device. To move data between the host and the storage device, an exchange of data between the front-end circuit and the back-end circuit can occur within the circuit board thus circumventing the cache of the data storage system. Such operation not only reduces traffic through the cache, but also shortens the data retrieval latency. The techniques of the invention may be used in computer systems, components and procedures such as those employed and manufactured by EMC Corporation of Hopkinton, Mass.

Figure 2:
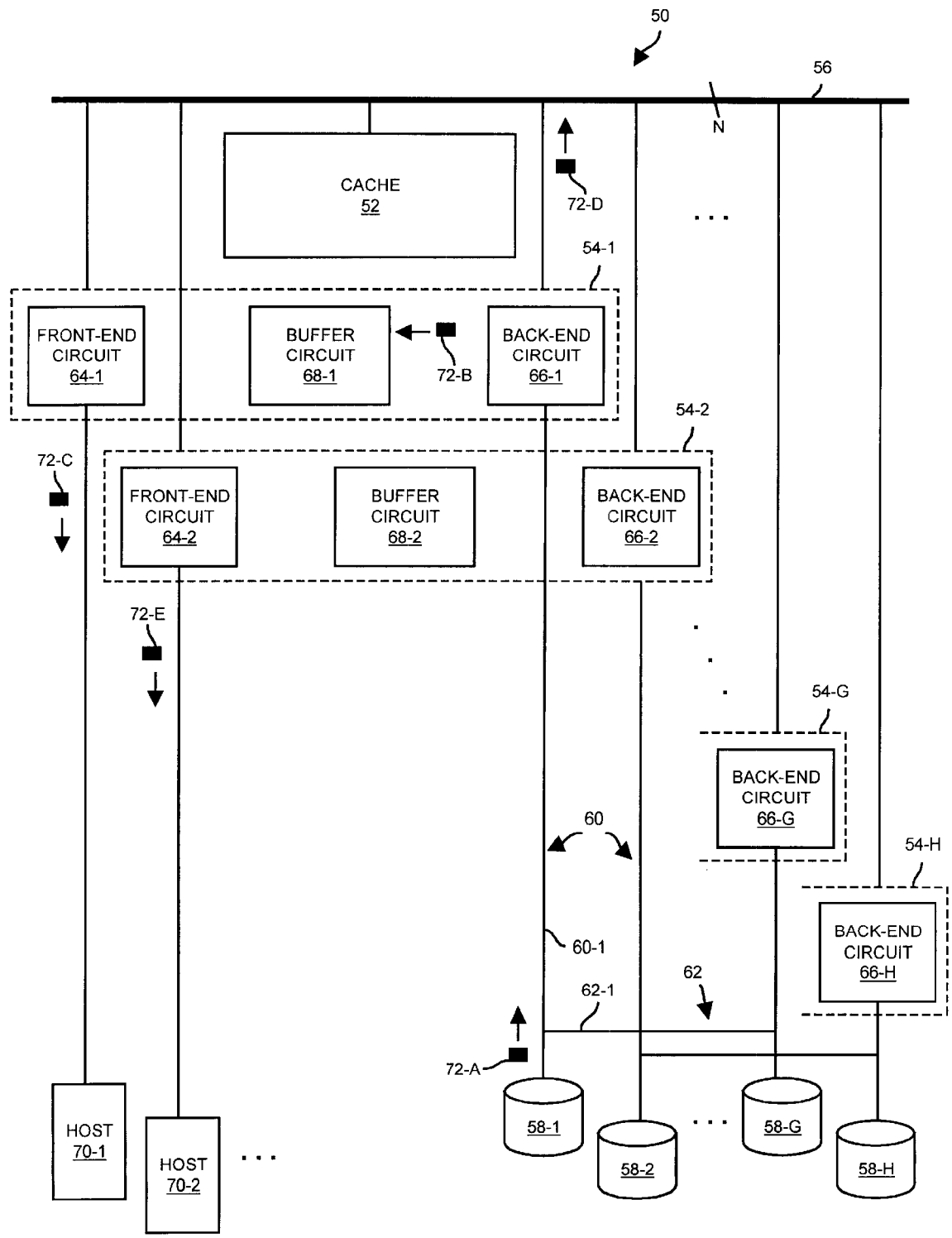
FIG. 2 is a block diagram of a data storage system, which has a circuit board that includes both a front-end circuit and a back-end circuit, that is suitable for use by the invention.

FIG. 2 shows a data storage system 50 which is suitable for use by the invention. The data storage system 50 includes a cache 52, multiple circuit boards 54, a set of N buses 56 (N being a positive integer) that connect the circuit boards 54 with the cache 52, and multiple storage devices 58 that connect to the circuit boards 54. Each storage device 58 has a primary connection 60 to one circuit board 54 and a secondary connection 62 to another circuit board 54. For example, the storage device 58-1 has a primary connection 60-1 to the circuit board 54-2 and a secondary connection 62-1 to the circuit board 54-G.

In general, each circuit board 54 includes a front-end circuit 64, a back-end circuit 66, and a buffer circuit 68 that provides a pathway between that front-end circuit 64 and that back-end circuit 66. Each front-end circuit 64 operates as an interface between the cache 52 and a host 70. Similarly, each back-end circuit 66 operates as an interface between the cache 52 and a storage device 58. The front-end circuits 64 and the back-end circuits 66 have the capability to handshake with each other in a traditional manner for some situations, e.g., using read and notification messages and polling through the cache 52 for a non-cached read operation between the front-end circuit 64-1 and the back-end circuit 66-2.

Furthermore, each front-end circuit 64 has the capability to direct data flow to the back-end circuit 66 on the same circuit board 54, and each back-end circuit 66 has the capability to direct data flow to the front-end circuit 64 on the same circuit board 54, without the data ever leaving the circuit board 54. Accordingly, in some situations (e.g., a read-miss operation), the data can circumvent the cache 52 and take a direct path between a back-end circuit 66 and a front-end circuit 64 on the same circuit board 54 and thus provide a tremendous improvement in data transfer latency. Furthermore, such operation aids cache efficiency by allowing read-once data to remain un-cached so that it does not clog the infrastructure (i.e., the cache 52 and the N buses 56) with excess traffic for non-cached reads such as that which occurs in media streaming. Further details of how data can circumvent the cache 52 and the N buses 56 will now be provided.

In some situations, the data storage system 50 enables data to flow between the hosts 70 and the storage devices 58 without going through the N buses 56 or the cache 52. In particular, a data element 72 (e.g., a data block) can flow from a storage device 58 to a host 70 and avoid the N buses 56 and the cache 52 when both the back-end circuit 66 interfacing with that storage device 58 and the front-end circuit 64 interfacing with that host 70 reside on the same circuit board 54. For example and with reference to FIG. 2, a data element 72 can flow from the storage device 58-1 to the host 70-1 without going through the N buses 56 or the cache 52. First, the data element 72 travels from the storage device 58-1 to the back-end circuit 66-1 of the circuit board 54-1 through the primary connection 60-1 (see 72-1 in FIG. 2). Next, the data element 72 travels from the back-end circuit 66-1 to the front-end circuit 64-1 through the buffer circuit 68-1 (see 72-B). Finally, the data element 72 travels from the front-end circuit 64-1 to the host 70-1 (see 72-C). The data element 72 can thus flow from the storage device 58-1 to the host 70-1 without passing through the N buses 56 and the cache 52 since both the back-end circuit 66-1 interfacing with the storage device 58-1 and the front-end circuit 64-1 interfacing with the host 70-1 reside on the same circuit board 54-1.

It should be understood that data elements 72 can flow in the opposite direction, from the hosts 70 to the storage devices 58, and circumvent the N buses 56 and the cache 52 in some situations as well. In particular, when both front-end circuit 64 interfacing with the host 70 providing the data element 72 and the back-end circuit 66 interfacing with the storage device 58 that stores the data element reside on the same circuit board 54, the data element 72 can travel from the host 70 to the storage device 58 while circumventing the N buses 56 and the cache 52. For example, the host 70-1 can write a data element 72 to the storage device 58-1 through the front-end circuit 64-1, the buffer circuit 68-1 and the back-end circuit 66-1 of the circuit board 54-1.

However, in some situations, data passes through the buses 56 and the cache 52. In particular, in the context of retrieving a data element 72 from the storage devices 58, when the front-end circuit 64 that interfaces with a requesting host and the back-end circuit 66 interfacing with a storage device 58 that stores the data reside on different circuit boards 54, data passes through the buses 56 and the cache 52. For example, the data element 72 can flow from the storage device 58-1 to the host 70-2 through the bus 56 and the cache 52. First, the data element 72 travels from the storage device 58-1 to the back-end circuit 66-1 of the circuit board 54-1 through the primary connection 60-1 (again, see 72-1 in FIG. 2). Then, the data element 72 travels from the back-end circuit 66-1 to the cache 52 through one of the N buses 56 (see 72-D). Next, the data element 72 travels from the cache 52 through the one of the N buses 56 to the front-end circuit 64-2, and then to the host 70-2 (see 72-E).

Data elements 72 can flow from the hosts 70 to the storage devices 58 through the N buses 56 and the cache 52 in some situations as well. In particular, when the front-end circuit 64 interfacing with the host 70 providing the data element 72 and the back-end circuit 66 interfacing with the storage device 58 that stores the data element reside on different circuit boards 54, the data element 72 can travel from the host 70 to the storage device 58 through the buses 56 and the cache 52. For example, the host 70-2 can write a data element 72 to the storage device 58-1 through the front-end circuit 64-2 of the circuit board 54-2, one of the N buses 56, the cache 52 and the back-end circuit 66-1 of the circuit board 54-1. Further details of the circuit boards 54 will now be provided with reference to FIG. 3.

Figure 3:
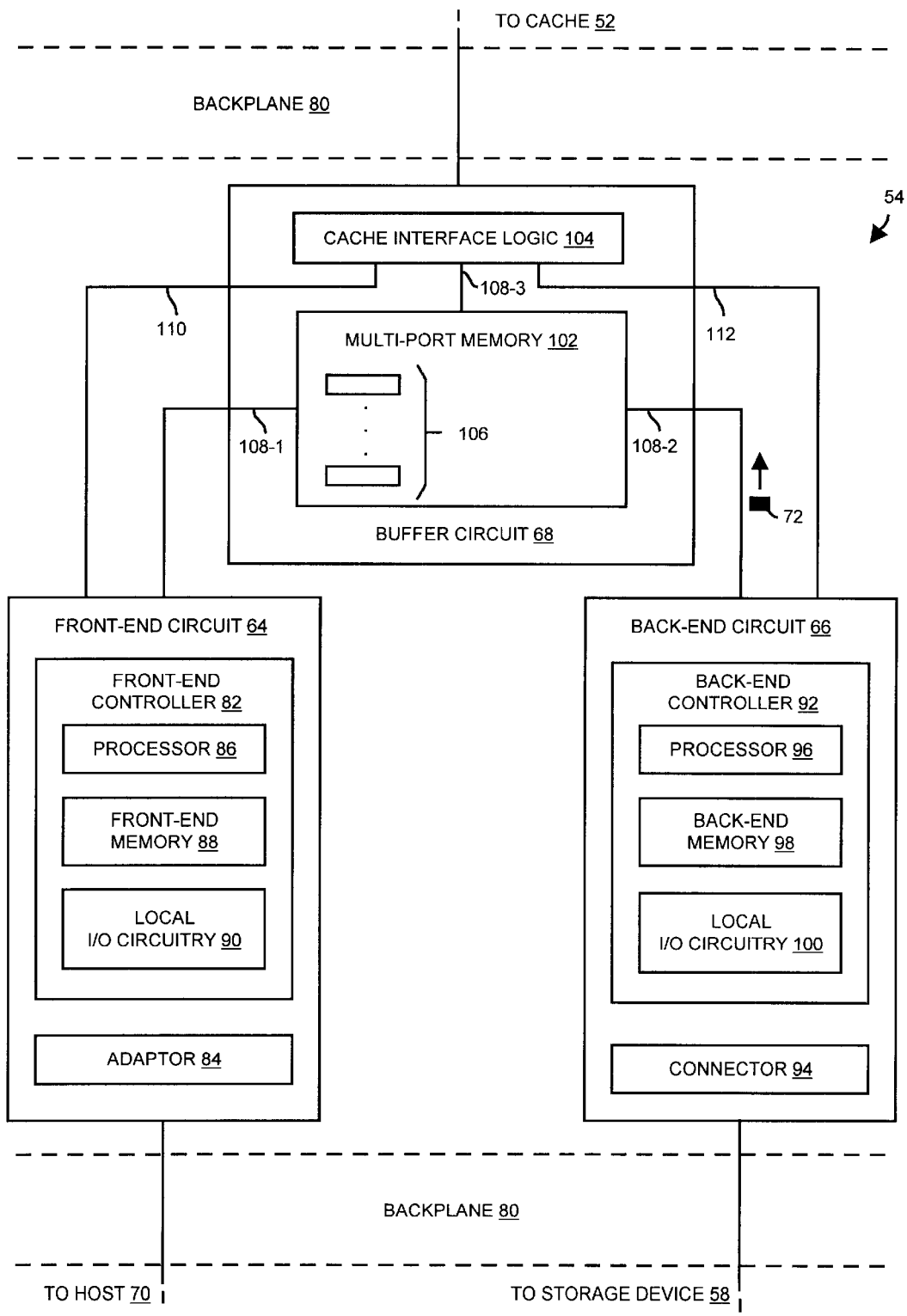
FIG. 3 is a block diagram of a circuit board of the data storage system of FIG. 2, the circuit board having a buffer circuit that provides a direct pathway between a front-end circuit and a back-end circuit to circumvent a cache of the data storage system in certain data transfer situations.

FIG. 3 shows a more-detailed block diagram of a circuit board 54 of FIG. 2. From a physical perspective, when the circuit board 54 is installed within the data storage system 50, the circuit board 54 connects with a backplane 80 that further connects to the cache 52 (e.g., on one or more other circuit boards), a host 70 and one or more storage devices 58.

As shown in FIG. 3, the front-end circuit 64 of the circuit board 54 includes a front-end controller 82 and an adaptor 84. The front-end controller 82 includes a processor 86, front-end memory 88, and local input/output (I/O) circuitry 90. The front-end memory 88 stores instructions (e.g., an application, a driver, etc.) that direct the operation of the processor 86, and thus the operation of the front-end controller 82. The front-end memory 88 further includes a table that enables the processor 86 to determine how to reach particular storage devices 58 (e.g., the storage device 58-1 through the back-end circuit 66-1, the storage device 58-2 through the back-end circuit 66-2, and so on, see FIG. 2). The adaptor 84 reformats data between the host 70 and the local I/O circuitry 90 in accordance with particular host protocols such as SCSI, ESCON, Fiber Channel, etc. For example, if the host 70 provides SCSI signals to the data storage device 50, the adaptor 84 converts the SCSI signals into generic signals for use by the front-end controller 82, and converts generic signals from the front-end controller 82 into SCSI signals for use by the host 70.

Similarly, the back-end circuit 66 includes a back-end controller 92 and an connector 94. The back-end controller 92 includes a processor 96, back-end memory 98, and local input/output (I/O) circuitry 100. The back-end memory 98 stores instructions that direct the operation of the processor 96, and thus the operation of the back-end controller 92. The back-end memory 98 further includes a table that enables the processor 96 to determine how to reach particular hosts 70 (e.g., the host 70-1 through the front-end circuit 64-1, the host 70-2 through the front-end circuit 64-2, and so on). The connector 94 conveys data between the local I/O circuitry 100 and the connected storage device 58 (through the backplane 80).

The buffer circuit 68 includes a multi-port memory 102 and cache interface logic 104. The multi-port memory 102 includes multiple memory locations 106 for storing data (e.g., data elements 72) and ports 108. A first port 108-1 connects the multi-port memory 102 to the front-end circuit 64. A second port 108-2 connects the multi-port memory 102 to the back-end circuit 66. A third port 108-3 connects the multi-port memory 102 to the cache interface logic 104. The cache interface logic 104 leads to the N buses 56 and the cache 52.

Optionally, the circuit board 54 includes a bypass 110 between the front-end circuit 64 and the cache interface logic 104 of the buffer circuit 68, and a bypass 122 between the back-end circuit 66 and the cache interface logic 104. The bypass 112 enables the back-end circuit 66 to transfer data to the memory 102 and the cache 52 at substantially the same time (e.g., a bicast read). Similarly, the bypass 110 enables the front-end circuit 64 to transfer data to the memory 102 and the cache 52 at substantially the same time (e.g., a bicast write). Placement of the data in the cache 52 as the data is exchanged between the front-end circuit 64 and the back-end circuit 66 enables the data to be accessed from the cache 52 in the future. Further details of how the circuit board 54 retrieves a data element 72 will now be provided with reference to FIG. 4.

Figure 4:
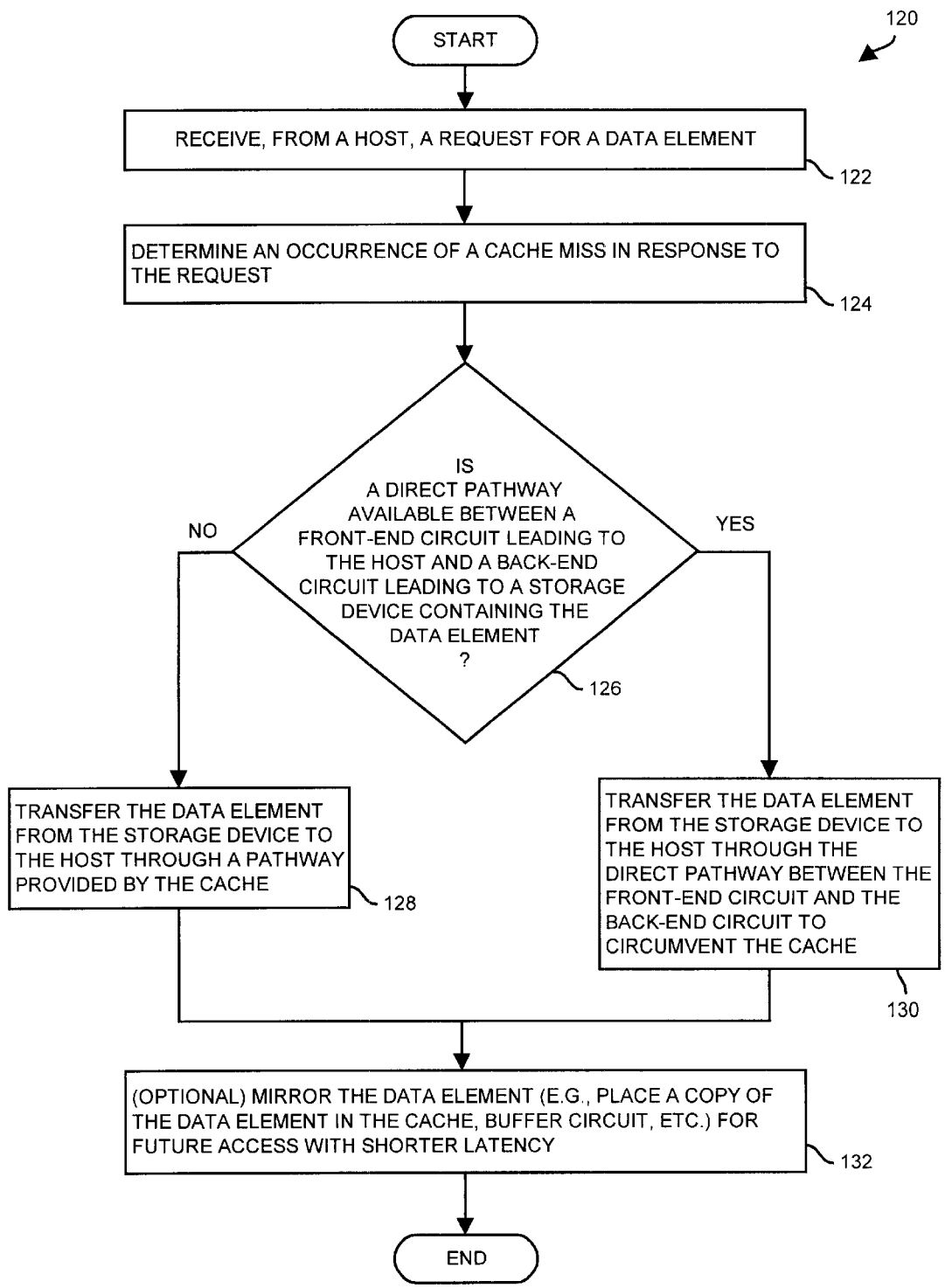
FIG. 4 is a procedure which is performed by the circuits of the data storage system of FIG. 2.

FIG. 4 shows a procedure 120 which is performed by the circuits of the data storage system 50 of FIG. 2 to respond to a request for a data element 72 in the event of a cache miss. In step 122, a front-end circuit 64 of a circuit board 54 receives a request from a host 70 for a data element 72 stored in one of the storage devices 58.

In step 124, the front-end circuit 64 determines that a cache miss has occurred, i.e., that an available copy of the data element 72 is neither in the cache 52 nor in the buffer circuit 68 of the circuit board 54 on which that front-end circuit 64 resides.

In step 126, the front-end circuit 64 determines whether a direct pathway is available between the front-end circuit 64 and the back-end circuit 66 that leads to the storage device 58 containing the data element 72, i.e., whether the front-end circuit 64 leading to the host 70 and the back-end circuit 66 leading the storage device 58 containing the data element 72 reside on the same circuit board 54. If there is a direct pathway available (i.e., if the front-end circuit 64 and the back-end circuit 66 reside on the same circuit board 54), step 126 proceeds to step 130. Otherwise, step 126 proceeds to step 128.

In step 128, when a direct pathway is not available (i.e., when the front-end circuit 64 and the back-end circuit 66 do not reside on the same circuit board 54), the back-end circuit 66 leading to the storage device 58 containing the data element 72 transfers a copy of the data element 72 from the storage device 58 through one of the N buses 56 to the cache 52, and then (on a different circuit board 54) the front-end circuit 64 leading to the host 70 transfers the copy of the data element 72 from the cache 52 through one of the N buses 56 to the host 70. This activity can be coordinated using conventional handshaking techniques (e.g., exchanging a read message from the front-end circuit 64 and a notify message from the back-end circuit 66 through the cache 52) or other mechanism (e.g., setting up paths in advance of a read or write operation in order to minimize or alleviate handshaking).

In step 130, when a direct pathway is available (i.e., when the front-end circuit 64 and the back-end circuit 66 reside on the same circuit board 54), the back-end circuit 66 transfers a copy of the data element 72 from the storage device 58 to the buffer circuit 68 on the same circuit board 54. The front-end circuit 64 on that circuit board 54 then transfers the copy of the data element 72 from the buffer circuit 68 to the host 70 thus circumventing the cache 52 and the N buses 56. Use of the direct pathway not only reduces traffic through the cache 52, but also shortens the data transfer latency.

Optionally, in step 132, the buffer circuit 68 or the cache 52 can retain the copy of the data element 72 so that the data storage system 50 can respond to a subsequent request for the data element 72 by simply transferring the data element 72 from the buffer circuit 68 or the cache 52 without re-reading the data element 72 from a storage device 58 (e.g., a cache hit). Avoidance of such re-reading from a storage device 58 reduces retrieval latency.

Further details of how the procedure 120 works will be provided through the following example. Suppose that the host 70-1 sends a request to the front-end circuit 64-1 for a data element 72 in the storage device 58-1 (see FIG. 2). The front-end circuit 64-1 receives the request (step 122).

The front-end circuit 64-1 then determines that the data element 72 neither resides in the buffer circuit 68-1 nor the cache 52 (a cache miss) in response to the request (step 124).

Next, the front-end circuit 64-1 determines (e.g., by accessing a table in the front-end memory 88) that the data element 72 resides in the storage device 58-1 which connects to the back-end circuit 66-1 of the same circuit board 54-1 such that a direct pathway exists (i.e. the buffer circuit 68-1) (step 126).

Accordingly, the front-end circuit 64-1 signals the back-end circuit 66-1 (e.g., places a read message in the buffer circuit 68-1) to copy the data element 72 from the storage device 58-1 to the buffer circuit 68-1. The back-end circuit 66-1, which periodically polls the multi-port memory 102 of the buffer circuit 68, responds by moving a copy of the data element 72 into the buffer circuit 68-1 and providing a notification message to the front-end circuit 64-1. The front-end circuit 64-1, which also periodically polls the multi-port memory 102 of the buffer circuit 68, then finds the copy of the data element 72 in the buffer circuit 68-1 and provides it to the host 70 (step 130). Since the transfer of the copy of the data element 72 circumvented the buses 56 and the cache 52, congestion of the buses 56 and the cache 52 was decreased and retrieval latency was reduced. Further details of how the circuit board 54 stores a data element 72 in a storage device 58 for a host 70 will now be provided.

For the host 70-1 to store a data element 72 in the storage device 58-1, the host 70-1 provides the data element 72 to the front-end circuit 64-1 of the circuit board 54-1 (see FIG.

2). When the data element 72 enters the front-end circuit 64-1, the adaptor 84 (see FIG. 3) translates the data element 72 from a particular host protocol (e.g., Fiber Channel) into generic signals for use within the data storage system 50 (e.g. TTL level signals, etc.). The front-end controller 82 then transfers the data element 72 through its local I/O circuitry 90 into the buffer circuit 68-1 (i.e., through port 108-1 into the multi-port memory 102). The front-end controller 82 accesses a table within the front-end memory 88 to determine the proper storage device 58 to store the data element 72. In one arrangement, the front-end controller 82 provides a destination identifier with the data element 72. In another arrangement, the destination identifier is built into the data element 72.

Since the destination of the data element 72 is the storage device 58-1, the destination identifier indicates that the data element 72 need not pass through the buses 56 or the cache 52. Rather, the back-end controller 92 of the back-end circuit 66-1, which periodically polls the buffer circuit 68-1, copies the data element 72 from the buffer circuit 68-1 through the local I/O circuitry 100 and the connector 94 into the storage device 58-1. Accordingly, the data element 72 circumvents the N buses 56 and the cache 52.

However, if the destination of the data element 72 had been the storage device 58-2, the destination identifier would have signals the cache interface logic 104 to copy the data element 72 through one of the N buses 56 into the cache 52. Then, the back-end circuit 66-2 of the circuit board 54-2 (which polls the cache 52) would have copied the data element 72 from the cache 52 (through the local I/O circuitry 100 and the connector 94 of the back-end circuit 66-2) into the storage device 58-2. It should be understood that conventional handshaking mechanisms between the front-end circuit 66-1 and the back-end circuit 66-2 are suitable for use in this situation (e.g., message exchanging and polling) although other methods can be used.

As an alternative to exchanging handshaking messages between a front-end circuit 64 and a back-end circuit 66 for each data element transfer, a path can be established between the front-end circuit 64 and the back-end circuit 66 prior to the data transfer. For example, for a data element write operation, the front-end circuit 64 can simply set up a particular memory address for the path (i.e., an address of the cache 52 for a data element transfer between the front-end circuit 64 and the back-end circuit 66 of different circuit boards 54, or an address of the buffer circuit memory 102 for a data element transfer between the front-end circuit 64 and the back-end circuit 66 of the same circuit board 54). Then, the front-end circuit 64 can write the data element to that address without needing to subsequently send a message to the back-end circuit 66. When the back-end circuit 66 sees that a data element has been written to that address, the back-end circuit 66 can simply transfer that data element from that address in memory to its proper destination without needing to poll for a message from the front-end circuit 64 since the back-end circuit 66 already expected the arrival of the data element.

As described above, the invention is directed to techniques for accessing data within a data storage system 50 having a circuit board 54 that includes both a front-end circuit 64 for interfacing with a host 70 and a back-end circuit 66 for interfacing with a storage device 58. To move data between the host 70 and the storage device 58, an exchange of data between the front-end circuit 64 and the back-end circuit 66 can occur within the circuit board 54 thus circumventing the cache 52 of the data storage system 50. That is, in some situations (e.g., a read-miss operation), the data can circumvent the cache 52 and take a direct path from a back-end circuit 66 to a front-end circuit 64 on the same circuit board 54 and thus provide a substantial improvement in data transfer latency. Such operation aids cache efficiency by allowing read-once data to remain un-cached so that it does not clog the infrastructure (i.e., the cache 52 and the N buses 56) with excess traffic for non-cached reads such as occurs in media streaming. The features of the invention may be particularly useful when employed in data storage systems, devices and methods, as well as in other computer-related mechanisms such as those manufactured by EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

Figure 5:
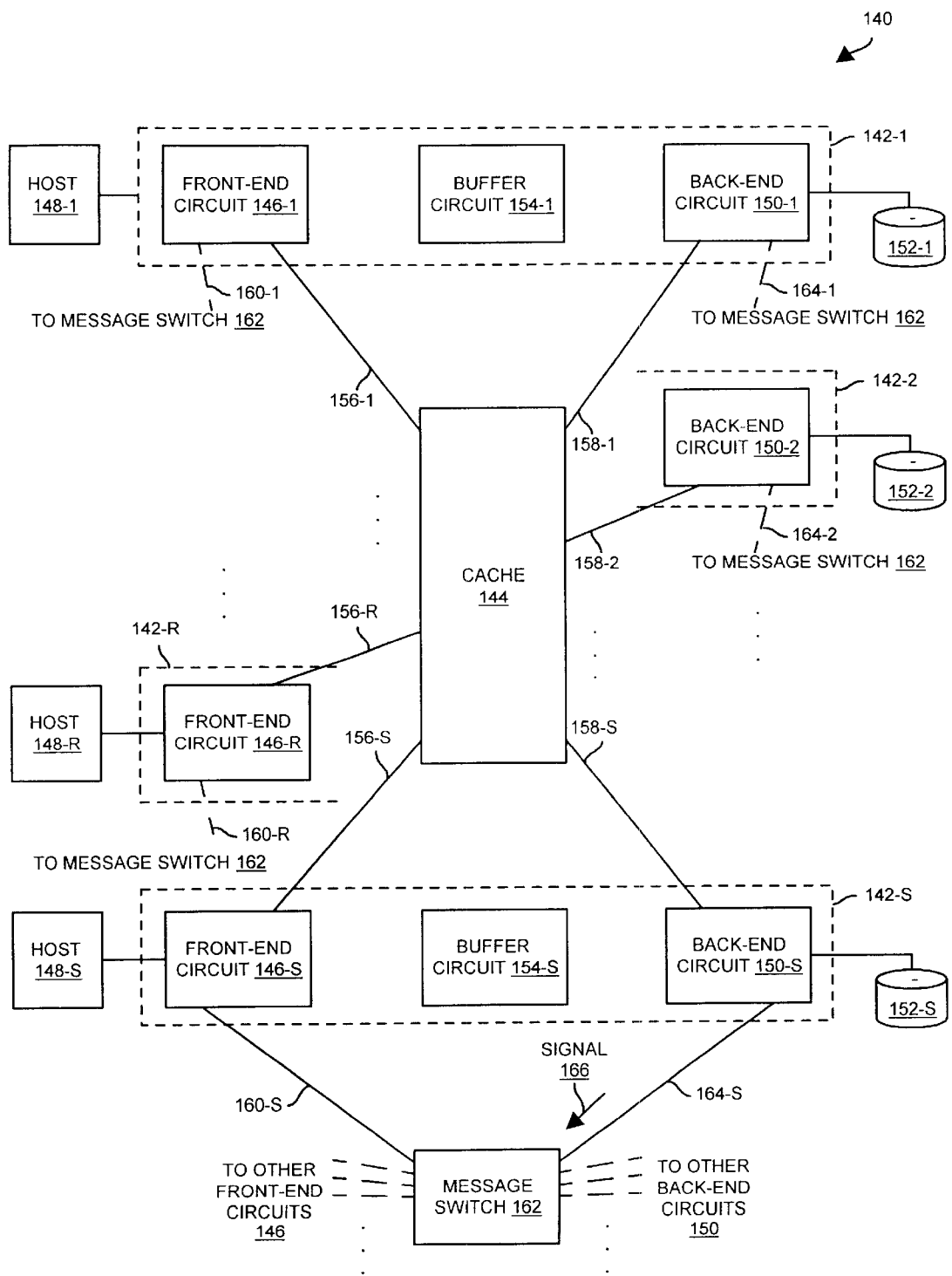
FIG. 5 is a block diagram of an alternative data storage system which is suitable for use by the invention.

For example, it should be understood that the data storage system 50 was described and shown as including a set of N buses 56 leading a cache 52 by way of example only. In other arrangements, point-to-point connections are used rather than the N buses 56. FIG. 5 shows, by way of example, a data storage system 140 that includes circuit boards 142 and a cache 144 that are, in some respects, similar to the circuit boards 54 and the cache 52 of the data storage system 50 (also see FIG. 3). That is, each circuit board 142 has a front-end circuit 146 that operates as an interface to a host 148, a back-end circuit 150 that operates as an interface to a storage device 152, and a buffer circuit 154. Additionally, the cache 144 operates as a buffer between the hosts 148 and the storage devices 152. However, each front-end circuit 146 connects to the cache 144 through a point-to-point connection 156, and each back-end circuit 150 connects to the cache 144 through a point-to-point connection 158. Additionally, each front-end circuit 146 has a connection 160 to a switch 162 of the data storage system 140, and each back-end circuit 150 has a connection 164 to the switch 162. The connections 160, 164 enable communication signals 166 between the front-end circuits 140 and the back-end circuits 150 to circumvent the cache 144.

Figure 1:
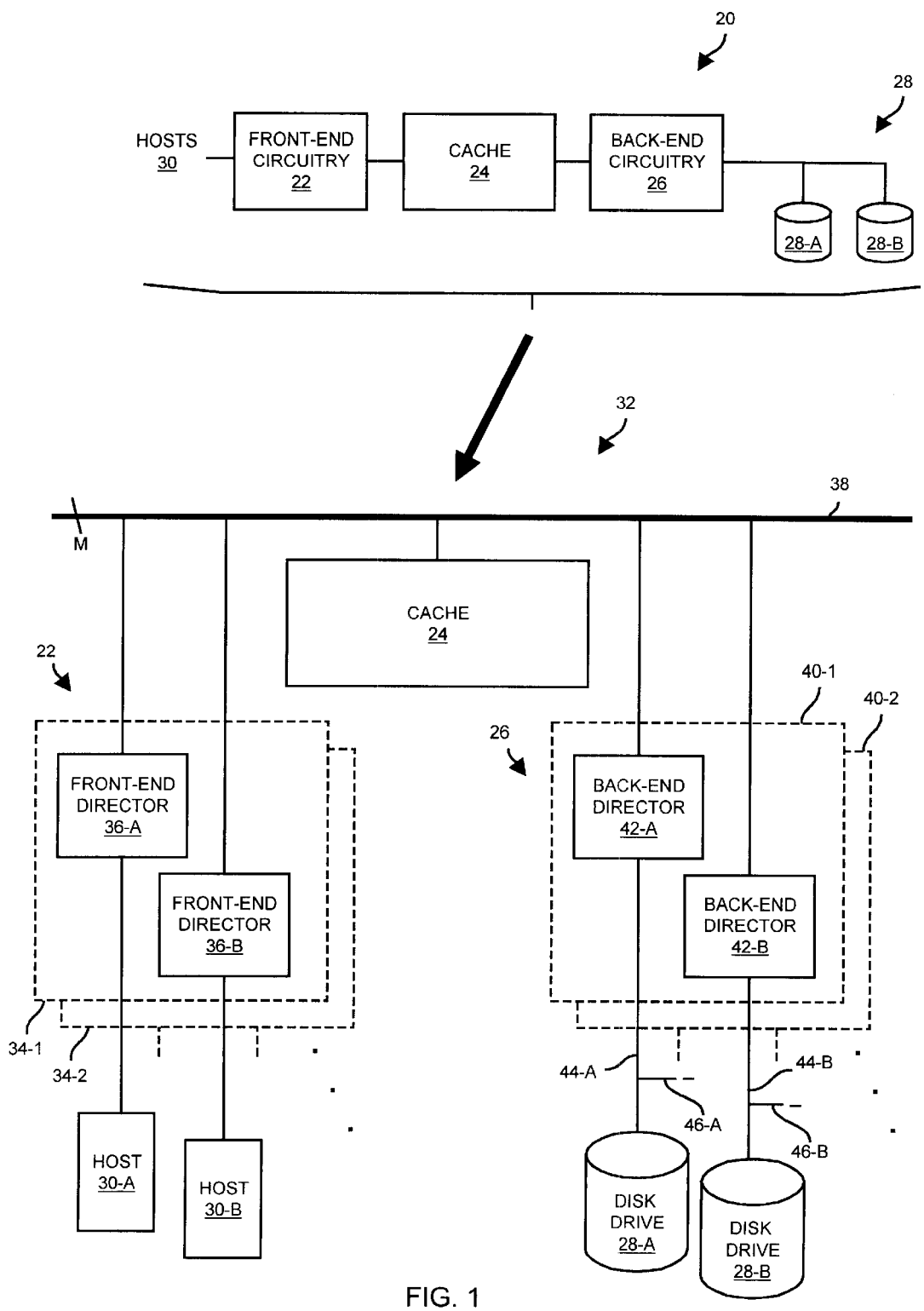
FIG. 1 is a block diagram of a conventional data storage system having multiple front-end directors on a single circuit board and multiple back-end directors on another single circuit board.

The point-to-point connections 156, 158 avoid bus arbitration and bus congestion delays which characterize conventional bus/cache architectures (see FIG. 1). Furthermore, the connections 160, 164 carry signals 166 (e.g., handshaking messages) between the front-end circuits 146 and the back-end circuits 150 which circumvent the cache 144 thus avoiding the need for excess handshaking/traffic (e.g., read and notification messages) through the cache 144 as is common in conventional bus/cache architectures (again, see FIG. 1). Accordingly, in addition to providing many of the features and benefits of the data storage system 50 (e.g., direct pathways that enable data elements to circumvent the cache in some situations), the architecture of the data storage system 140 enables data transfer through the cache 144 with handshaking communications using signals 166 through a separate switch 162. As a result, the cache 144 is less congested, and unnecessary delays are avoided thus minimizing data retrieval latencies.

It should be further understood other modifications and variations can be made to the above-described data storage system 140. For example, the storage devices 152 can include multiple connections to respective back-end circuits 150 in a manner similar to the storage devices 58 of FIG. 2. By way of example only, the storage device 152-1 can have a first connection to the back-end circuit 150-1 and another connection to the back-end circuit 150-S.

Additionally, it should be understood that the cache 144 can include multiple memory circuit boards which form redundant cache memories. Preferably, each front-end circuit 146 and each back-end circuit 150 has a point-to-point connection to each cache memory.

Furthermore, it should be understood that the data element 72 was described as a block of data (512 bytes) by way of example only. The above-described data storage systems 50, 140 can store and retrieve data elements 72 of other sizes as well, such as packets, cells, frames, quadwords, etc.

Additionally, it should be understood that the connection assembly for the data storage system 50 was described above as a single backplane 80 by way of example only (see FIG. 3). In other arrangements, the multiple backplanes are used for connecting different components, e.g., a first backplane to connect the circuit board 54 to the cache 52, a second backplane to connect to the host 70, etc.

Furthermore, it should be understood that the hosts 70, 148 do not need to correspond to a single front-end circuit 64, 146 as shown in FIGS. 2 and 5. Rather, the hosts 70, 148 can connect to multiple front-end circuits 64,146 through a common network (e.g., a backbone, token-ring, etc.) using an addressing or identification scheme.

Additionally, it should be understood that the buffer circuit memory 102 was described as a multi-port memory having multiple memory locations 106 by way of example only. In some arrangements, the memory 102 is simply a point of transfer (e.g., a register).

Furthermore, it should be understood that the circuit boards 54, 164 (see FIGS. 3 and 5) were described as including one front-end circuit 64, 146 and one back-end circuit 66, 150 by way of example only. In other arrangements, the circuit boards 54, 164 include multiple front-end circuits 64, 146. In other arrangements, the circuit boards 54 include multiple back-end circuits 66, 150. In yet other arrangements, the circuit boards 54 include multiple front-end circuits 64, 146 and multiple back-end circuits 66, 150 (e.g., two front-end circuits and two back-end circuits, or eight front-end circuits and 16 back-end circuits). Such modifications and enhancements are intended to be within the scope of the invention.

What is claimed is:

1. A data storage system, comprising:
   a cache;
   a first front-end circuit that operates as an interface between the cache and a first host;
   a second front-end circuit that operates as an interface between the cache and a second host;
   a first storage device;
   a second storage device;
   a first back-end circuit that operates as an interface between the cache and the first storage device; and
   a second back-end circuit that operates as an interface between the cache and the second storage device, wherein the first front-end circuit and the first back-end circuit reside on a first circuit board, wherein the second front-end circuit and the second back-end circuit reside on a second circuit board;
   a buffer circuit interconnected between the first front-end circuit and the first back-end circuit and that resides on the first circuit board to provide a direct data pathway between the first front-end circuit and the first back-end circuit that circumvents the cache, the buffer circuit being configured to carry data elements between the first front-end circuit and the first back-end circuit.

2. The data storage system of claim 1 wherein the first storage device stores a data element, and wherein the first front-end circuit and the first back-end circuit are configured to respond to a request, from the first host, for the data element resulting in a cache miss by transferring a copy of the data element from the first storage device to the first host through the direct data pathway between the first front-end circuit and the first back-end circuit that circumvents the cache.

3. The data storage system of claim 2 wherein the first back-end circuit is further configured to provide a copy of the data element to the cache in order to mirror, within the cache, the data element stored in the first storage device.

4. The data storage system of claim 2 wherein the first front-end circuit and the first back-end circuit are further configured to retain a copy of the data element in the buffer circuit in order to mirror, within the buffer circuit, the data element stored in the first storage device.

5. The data storage system of claim 2 wherein the cache provides a data pathway between the second front-end circuit and the first back-end circuit; and wherein the second front-end circuit and the first back-end circuit are configured to respond to a request, from the second host, for the data element resulting in a cache miss by transferring a copy of the data element from the first storage device to the second host through the data pathway between the second front-end circuit and the first back-end circuit.

6. The data storage system of claim 2 wherein the cache provides a data pathway between the first front-end circuit and the second back-end circuit; wherein the second storage device stores another data element; and wherein the first front-end circuit and the second back-end circuit are configured to respond to a request, from the first host, for the other data element resulting in a cache miss by transferring a copy of the other data element from the second storage device to the first host through the data pathway between the first front-end circuit and the second back-end circuit.

7. The data storage system of claim 1 wherein the buffer circuit includes multi-ported random access memory having:
   memory locations;
   a first port, coupled to the first front-end circuit, that enables the first front-end circuit to the access memory locations; and
   a second port, coupled to the first back-end circuit, that enables the first back-end circuit to access the memory locations.

8. The data storage system of claim 7 wherein the multi-ported random access memory further includes:
   a third port, coupled to the cache, that enables circuitry other than the first front-end circuit and the first back-end circuit to move data elements between the memory locations and the cache.

9. The data storage system of claim 1 wherein the first front-end circuit includes a controller configured to access the buffer circuit on behalf of the first host; wherein the first back-end circuit includes a controller configured to access the buffer circuit on behalf of the first storage device; and wherein the data storage system further comprises a switch that provides a message pathway between the controller of the first front-end circuit and the controller of the first back-end circuit, the message pathway enabling the controller of the first back-end circuit to provide a signal to the controller of the first front-end circuit indicating that a copy of a data element has been transferred from the first storage device to the buffer circuit in response to a request from the first host and handled by the controller of the first front-end circuit resulting in a cache miss.

10. A circuit board for a data storage system having a cache that resides on a separate circuit board and a storage device, the circuit board comprising:

a front-end circuit that operates as an interface between the cache and a host;

a back-end circuit that operates as an interface between the cache and the storage device; and a buffer circuit interconnected between the front-end circuit and the back-end circuit to provide a direct data pathway between the front-end circuit and the back-end circuit that circumvents the cache of the data storage system; wherein the buffer circuit is configured to carry data elements between the front-end circuit and the back-end circuit.

11. The circuit board of claim 10 wherein the storage device stores a data element, and wherein the front-end circuit and the back-end circuit are configured to respond to a request, from the host, for the data element resulting in a cache miss by transferring a copy of the data element from the storage device to the host through the direct data pathway between the front-end circuit and the back-end circuit that circumvents the cache.

12. The circuit board of claim 11 wherein the back-end circuit is further configured to provide a copy of the data element to the cache in order to mirror, within the cache, the data element stored in the storage device.

13. The circuit board of claim 11 wherein the front-end circuit and the back-end circuit are further configured to retain a copy of the data element in the buffer circuit in order to mirror, within the buffer circuit, the data element stored in the storage device.

14. The circuit board of claim 10 wherein the buffer circuit includes multi-ported random access memory having:

memory locations;

a first port, coupled to the front-end circuit, that enables the front-end circuit to the access memory locations; and a second port, coupled to the back-end circuit, that enables the back-end circuit to access the memory locations.

15. The circuit board of claim 14 wherein the multi-ported random access memory further includes:

a third port that couples to the cache to enable circuitry other than the front-end circuit and the back-end circuit to move data elements between the memory locations and the cache.

16. The circuit board of claim 10 wherein the front-end circuit includes a controller configured to access the buffer circuit on behalf of the host; wherein the back-end circuit includes a controller configured to access the buffer circuit on behalf of the storage device; and wherein the data storage system further includes a switch that provides a message pathway between the controller of the front-end circuit and the controller of the back-end circuit, the message pathway enabling the controller of the back-end circuit to provide a signal to the controller of the front-end circuit indicating that a copy of a data element has been transferred from the storage device to the buffer circuit in response to a request from the host and handled by the controller of the front-end circuit resulting in a cache miss.

17. A method for accessing data from a data storage system having a cache, a front-end circuit that operates as an interface between the cache and a host, a storage device that stores a data element, a back-end circuit that operates as an interface between the cache and the storage device, and a buffer circuit that provides a direct data pathway between the front-end circuit and the back-end circuit that circumvents the cache, the method comprising the steps of:

receiving, from the host, a request for the data element;

determining an occurrence of a cache miss in response to the request; and transferring the data element from the storage device to the host through the direct data pathway provided by the buffer circuit, between the front-end circuit and the back-end circuit that circumvents the cache;

wherein the buffer circuit is configured to carry data elements between the front-end circuit and the back-end circuit.

18. The method of claim 17, further comprising the step of:

providing a copy of the data element to the cache in order to mirror, within the cache, the data element stored in the storage device.

19. The method of claim 17, further comprising the step of:

retaining a copy of the data element in the buffer circuit in order to mirror, within the buffer circuit, the data element stored in the storage device.

20. The method of claim 17 wherein the cache provides a data pathway between another front-end circuit and the back-end circuit; and wherein the other front-end circuit and the back-end circuit are configured to respond to a request, from another host, for the data element resulting in a cache miss by transferring a copy of the data element from the storage device to the other host through the data pathway between the other front-end circuit and the back-end circuit.

21. The method of claim 17 wherein the cache provides a data pathway between the front-end circuit and another back-end circuit; wherein another storage device stores another data element; and wherein the front-end circuit and the other back-end circuit are configured to respond to a request, from the host, for the other data element resulting in a cache miss by transferring a copy of the other data element from the other storage device to the host through the data pathway between the front-end circuit and the other back-end circuit.

* * * * *